(12) United States Patent
Corvec et al.

(10) Patent No.: US 12,017,171 B2
(45) Date of Patent: Jun. 25, 2024

(54) FILTER ELEMENT AND HOUSING HAVING NON-CIRCULAR CROSS-SECTIONS

(71) Applicant: Cummins Filtration Sarl, Quimper (FR)

(72) Inventors: Ronan Corvec, Quimper (FR); Emmanuel Page, Tremeoc (FR)

(73) Assignee: Cummins Filtration Sarl, Quimper (FR)

(*) Notice: Subject to any disclaimer, the term of this patent is extended or adjusted under 35 U.S.C. 154(b) by 869 days.

(21) Appl. No.: 16/976,846

(22) PCT Filed: Mar. 4, 2019

(86) PCT No.: PCT/EP2019/055266
§ 371 (c)(1),
(2) Date: Aug. 31, 2020

(87) PCT Pub. No.: WO2019/170579
PCT Pub. Date: Sep. 12, 2019

(65) Prior Publication Data
US 2020/0406181 A1    Dec. 31, 2020

(30) Foreign Application Priority Data
Mar. 5, 2018    (FR) ..................... 1851888

(51) Int. Cl.
*B01D 46/00* (2022.01)
*B01D 46/24* (2006.01)

(52) U.S. Cl.
CPC ..... *B01D 46/0005* (2013.01); *B01D 46/2414* (2013.01); *B01D 2265/029* (2013.01);
(Continued)

(58) Field of Classification Search
CPC ............ B01D 46/0005; B01D 46/2414; B01D 2265/029; B01D 2271/027;
(Continued)

(56) References Cited

U.S. PATENT DOCUMENTS 2,108,283 A    2/1938  Drew et al.
3,295,687 A    1/1967  Schmerler
(Continued)

FOREIGN PATENT DOCUMENTS

CN    1652859    8/2005
CN    102258918  11/2011
(Continued)

OTHER PUBLICATIONS

Office Action issued for U.S. Appl. No. 17/113,619 dated Feb. 9, 2022, 24 pages.
(Continued)

*Primary Examiner* — Dung H Bui
(74) *Attorney, Agent, or Firm* — Foley & Lardner LLP

(57) ABSTRACT

A filter assembly comprises a filter element and a housing. The filter element comprises a filter media, and an alignment feature positioned on at least a portion of an outer surface of the filter media. The alignment feature comprises an alignment channel. The housing defines a housing internal volume. At least a portion of the filter element is positioned within the housing internal volume. The housing comprises an alignment protrusion extending axially from a housing inner surface towards the filter element so as to mate with the alignment channel. The alignment feature comprises a ring member positioned circumferentially around the filter media at a filter media first end proximate to the housing, and a filter baffle extending from the ring member. The filter
(Continued)

baffle is circumferentially positioned on at least a portion of the outer surface of the filter media and defines the alignment channel.

20 Claims, 3 Drawing Sheets

(52) U.S. Cl.
CPC .. *B01D 2271/027* (2013.01); *B01D 2275/208* (2013.01); *B01D 2279/60* (2013.01)

(58) Field of Classification Search
CPC .......... B01D 2275/208; B01D 2279/60; B01D 46/64; B01D 2201/313; B01D 2265/021; B01D 2265/025; B01D 2265/026; B01D 46/0043
See application file for complete search history.

(56) References Cited

U.S. PATENT DOCUMENTS

| | | |
|---|---|---|
| 3,786,926 A | 1/1974 | Wilhelm |
| 4,613,438 A | 9/1986 | Degraffenreid |
| 4,916,001 A | 4/1990 | Whittenberger et al. |
| D326,706 S | 6/1992 | Karlsson |
| 5,609,761 A | 3/1997 | Franz |
| 5,800,580 A | 9/1998 | Feldt |
| 5,800,581 A * | 9/1998 | Gielink ............... B01D 46/62 55/498 |
| 5,803,941 A | 9/1998 | Berkhoel et al. |
| 5,954,849 A * | 9/1999 | Berkhoel ........... B01D 46/2414 55/498 |
| D437,402 S | 2/2001 | Gieseke et al. |
| 6,190,432 B1 | 2/2001 | Gieseke et al. |
| 6,197,191 B1 | 3/2001 | Wobben |
| D449,102 S | 10/2001 | Shin |
| 6,364,921 B1 | 4/2002 | Raether et al. |
| 6,387,162 B1 | 5/2002 | Kosmider et al. |
| 6,398,836 B1 | 6/2002 | Frankle |
| 6,485,544 B1 | 11/2002 | Ziske |
| 6,488,746 B1 | 12/2002 | Kosmider et al. |
| D475,781 S | 6/2003 | Mattsson et al. |
| D483,459 S | 12/2003 | Dewit et al. |
| D484,584 S | 12/2003 | Anderson et al. |
| D497,202 S | 10/2004 | Carter et al. |
| D499,177 S | 11/2004 | Kosmider et al. |
| 6,902,598 B2 | 6/2005 | Gunderson et al. |
| 6,966,940 B2 | 11/2005 | Krisko et al. |
| D525,120 S | 7/2006 | Maskell et al. |
| 7,147,110 B2 | 12/2006 | Clausen et al. |
| D545,396 S | 6/2007 | Casey et al. |
| 7,264,656 B2 | 9/2007 | Kosmider et al. |
| 7,282,077 B2 | 10/2007 | Honisch et al. |
| 7,332,009 B2 | 2/2008 | Casey et al. |
| 7,442,221 B2 | 10/2008 | Ruhland et al. |
| 7,670,403 B2 | 3/2010 | Modesto et al. |
| 7,828,870 B1 | 11/2010 | Rech et al. |
| RE42,174 E | 3/2011 | Gunderson et al. |
| 7,905,936 B2 | 3/2011 | Coulonvaux et al. |
| 7,959,703 B2 | 6/2011 | Merritt et al. |
| 8,097,061 B2 | 1/2012 | Smith et al. |
| 8,182,569 B2 | 5/2012 | Casey et al. |
| 8,241,384 B2 | 8/2012 | Schrage et al. |
| 8,245,851 B2 | 8/2012 | Hawkins et al. |
| 8,394,164 B2 | 3/2013 | Casey et al. |
| 8,397,920 B2 | 3/2013 | Moy et al. |
| D690,407 S | 9/2013 | Williams et al. |
| D692,298 S | 10/2013 | Pipes et al. |
| 8,613,784 B2 | 12/2013 | Heckel et al. |
| 8,632,619 B2 | 1/2014 | Komori et al. |
| 8,685,128 B2 | 4/2014 | Schrage et al. |
| D706,831 S | 6/2014 | Schultz |
| 8,864,866 B2 | 10/2014 | Osendorf et al. |
| 8,961,637 B2 | 2/2015 | Raether et al. |
| D736,263 S | 8/2015 | Schultz |
| 9,168,477 B2 | 10/2015 | Schulz et al. |
| 9,205,361 B2 | 12/2015 | Menssen et al. |
| 9,308,482 B2 | 4/2016 | Kaiser |
| 9,320,997 B2 | 4/2016 | Campbell et al. |
| 9,358,489 B2 | 6/2016 | Kaufmann et al. |
| 9,415,333 B2 | 8/2016 | Kindkeppel et al. |
| 9,446,339 B2 | 9/2016 | Rieger et al. |
| 9,463,405 B2 | 10/2016 | Bartel et al. |
| 9,604,856 B2 | 3/2017 | Fall |
| 9,610,529 B2 | 4/2017 | Mills et al. |
| 9,623,351 B2 | 4/2017 | Kindkeppel et al. |
| 9,636,615 B2 | 5/2017 | Osendorf et al. |
| 9,649,581 B2 | 5/2017 | Conroy |
| 9,682,339 B2 | 6/2017 | Jursich et al. |
| D793,453 S | 8/2017 | Krull |
| D794,082 S | 8/2017 | Krull |
| D798,907 S | 10/2017 | Krull |
| D799,657 S | 10/2017 | Sullivan et al. |
| D804,004 S | 11/2017 | Madeira et al. |
| 9,827,527 B2 | 11/2017 | Merritt et al. |
| 9,849,408 B2 | 12/2017 | Stehle et al. |
| D819,698 S | 6/2018 | Krull |
| D819,699 S | 6/2018 | Krull |
| 9,987,571 B2 | 6/2018 | Klein et al. |
| D852,345 S | 6/2019 | Stanhope et al. |
| D884,866 S | 5/2020 | Knight et al. |
| 10,758,859 B2 | 9/2020 | Gieseke et al. |
| D909,557 S | 2/2021 | Jeon et al. |
| D911,642 S | 2/2021 | Burgess et al. |
| 10,918,978 B2 | 2/2021 | Knight et al. |
| D926,961 S | 8/2021 | Lee |
| D930,136 S | 9/2021 | Knight et al. |
| 11,117,085 B2 | 9/2021 | Nelson et al. |
| 11,123,676 B2 | 9/2021 | Schrage et al. |
| D935,587 S | 11/2021 | Wu |
| 11,198,082 B2 | 12/2021 | Rahn et al. |
| D965,125 S | 9/2022 | Zhang |
| 11,452,952 B2 | 9/2022 | Knight et al. |
| D969,289 S | 11/2022 | Manke et al. |
| 11,498,022 B2 | 11/2022 | Schwartz et al. |
| 2003/0168398 A1 | 9/2003 | Steger et al. |
| 2004/0035094 A1 * | 2/2004 | Jersey ............... B01D 46/2414 55/498 |
| 2004/0035097 A1 | 2/2004 | Schlensker et al. |
| 2004/0238437 A1 | 12/2004 | Nguyen et al. |
| 2005/0210846 A1 * | 9/2005 | Miyagishima ......... F02M 35/02 55/498 |
| 2005/0235620 A1 * | 10/2005 | Connor ................. B01D 46/88 55/498 |
| 2006/0070945 A1 | 4/2006 | Men et al. |
| 2006/0081528 A1 | 4/2006 | Oelpke et al. |
| 2006/0096908 A1 | 5/2006 | Wolf et al. |
| 2006/0174598 A1 | 8/2006 | Mills et al. |
| 2007/0000830 A1 | 1/2007 | Snider et al. |
| 2007/0193236 A1 | 8/2007 | Merritt |
| 2008/0029453 A1 | 2/2008 | Mertens et al. |
| 2008/0041026 A1 | 2/2008 | Engel et al. |
| 2008/0245719 A1 | 10/2008 | Beard et al. |
| 2009/0064646 A1 | 3/2009 | Reichter et al. |
| 2009/0188220 A1 | 7/2009 | Freisinger et al. |
| 2010/0000922 A1 | 1/2010 | Crawford |
| 2010/0064646 A1 | 3/2010 | Smith et al. |
| 2010/0252495 A1 * | 10/2010 | Reid ..................... B01D 29/237 210/455 |
| 2011/0210053 A1 | 9/2011 | Strassenberger |
| 2012/0160755 A1 | 6/2012 | Lacroix et al. |
| 2012/0223001 A1 | 9/2012 | Beard |
| 2012/0246907 A1 * | 10/2012 | Morgan ............. B01D 46/2411 29/428 |
| 2013/0140227 A1 | 6/2013 | Stehle et al. |
| 2013/0228504 A1 | 9/2013 | McElroy et al. |
| 2013/0255203 A1 | 10/2013 | Muenkel et al. |
| 2013/0298775 A1 * | 11/2013 | Fiet ........................ A62B 9/04 96/147 |
| 2014/0137525 A1 | 5/2014 | Campbell et al. |
| 2014/0165834 A1 * | 6/2014 | Kaufmann ......... F02M 35/0201 55/502 |
| 2014/0250843 A1 | 9/2014 | Krull et al. |

(56) References Cited

U.S. PATENT DOCUMENTS

| | | | |
|---|---|---|---|
| 2014/0260142 A1* | 9/2014 | Raether | B01D 46/521 |
| | | | 55/498 |
| 2014/0298612 A1* | 10/2014 | Williams | B01D 46/2414 |
| | | | 55/498 |
| 2014/0373495 A1 | 12/2014 | Madeira et al. | |
| 2015/0020488 A1* | 1/2015 | Dhiman | B01D 46/0005 |
| | | | 55/502 |
| 2015/0101295 A1 | 4/2015 | Thompson et al. | |
| 2015/0101298 A1 | 4/2015 | Osendorf et al. | |
| 2015/0151233 A1 | 6/2015 | Johnson et al. | |
| 2015/0176544 A1* | 6/2015 | Kaufmann | F02M 35/02416 |
| | | | 55/425 |
| 2015/0246303 A1* | 9/2015 | Ben-Shimon | B01D 35/153 |
| | | | 210/248 |
| 2015/0343339 A1 | 12/2015 | Johnson et al. | |
| 2015/0343359 A1* | 12/2015 | Neef | B01D 46/2411 |
| | | | 55/495 |
| 2016/0045848 A1 | 2/2016 | Campbell et al. | |
| 2016/0051912 A1 | 2/2016 | Castaneda et al. | |
| 2016/0101380 A1* | 4/2016 | Pereira Madeira | B01D 46/009 |
| | | | 210/232 |
| 2016/0131094 A1 | 5/2016 | Pereira Madeira et al. | |
| 2016/0263495 A1 | 9/2016 | Wyhler et al. | |
| 2016/0296867 A1 | 10/2016 | Stark et al. | |
| 2016/0325212 A1 | 11/2016 | Pflueger et al. | |
| 2017/0102101 A1 | 4/2017 | Duval-Arnould | |
| 2017/0291129 A1* | 10/2017 | Sorger | B01D 46/62 |
| 2017/0361249 A1 | 12/2017 | Ries et al. | |
| 2018/0015406 A1 | 1/2018 | Nelson et al. | |
| 2018/0043290 A1 | 2/2018 | Bautz et al. | |
| 2018/0050296 A1 | 2/2018 | Fritzsching et al. | |
| 2018/0161703 A1 | 6/2018 | Bautz et al. | |
| 2018/0200652 A1 | 7/2018 | Merritt et al. | |
| 2018/0318745 A1 | 11/2018 | Nichols et al. | |
| 2019/0060816 A1 | 2/2019 | Wittmers et al. | |
| 2019/0070548 A1 | 3/2019 | Franz et al. | |
| 2019/0070549 A1 | 3/2019 | Fritzsching et al. | |
| 2019/0111374 A1 | 4/2019 | Burton et al. | |
| 2019/0134546 A1 | 5/2019 | Neef et al. | |
| 2019/0224604 A1 | 7/2019 | Lin et al. | |
| 2019/0270045 A1 | 9/2019 | Donauer et al. | |
| 2019/0308123 A1 | 10/2019 | Neef et al. | |
| 2019/0308124 A1 | 10/2019 | Neef | |
| 2019/0308125 A1 | 10/2019 | Neef et al. | |
| 2019/0308126 A1 | 10/2019 | Fritzsching et al. | |
| 2019/0344207 A1 | 11/2019 | Knight et al. | |
| 2020/0038795 A1* | 2/2020 | Adamek | B01D 50/20 |
| 2020/0054982 A1 | 2/2020 | Decoster et al. | |
| 2020/0384402 A1 | 12/2020 | Schwartz et al. | |
| 2021/0086109 A1 | 3/2021 | Knight et al. | |

FOREIGN PATENT DOCUMENTS

| | | |
|---|---|---|
| CN | 202538551 U | 11/2012 |
| CN | 103126613 | 6/2013 |
| CN | 103861397 | 6/2014 |
| CN | 104159652 | 11/2014 |
| CN | 204041298 U | 12/2014 |
| CN | 106039876 A | 10/2016 |
| CN | 106039878 | 10/2016 |
| CO | 2017008045 | 10/2017 |
| DE | 24 29 474 A1 | 11/1975 |
| DE | 10 2004 063 346 A1 | 7/2006 |
| DE | 20 2009 000 969 U1 | 7/2010 |
| DE | 10 2009 050 587 A1 | 4/2011 |
| DE | 10 2013 216 853 A1 | 2/2015 |
| DE | 10 2015 015 778 A1 | 7/2016 |
| DE | 10 2016 004 316 A1 | 1/2017 |
| DE | 10 2016 008 475 A1 | 1/2017 |
| DE | 10 2016 004 317 | 10/2017 |
| EP | 1 031 310 A2 | 8/2000 |
| EP | 0 923 975 B1 | 5/2003 |
| EP | 1 658 121 | 5/2006 |
| FR | 2847488 A1 | 5/2004 |
| GB | 0 808 476 A | 2/1959 |
| GB | 2 346 568 A | 8/2000 |
| GB | 2 375 494 A | 11/2002 |
| JP | 4141226 A | 5/2004 |
| WO | WO-03/084641 A2 | 10/2003 |
| WO | WO-2005/011838 | 2/2005 |
| WO | WO-2011/146474 A1 | 11/2011 |
| WO | WO-2013/104797 | 7/2013 |
| WO | WO-2015/061599 | 4/2015 |
| WO | WO-2015/171744 A1 | 11/2015 |
| WO | WO-2016/082854 A1 | 6/2016 |
| WO | WO-2016/100772 A1 | 6/2016 |
| WO | WO-2017/012932 A1 | 1/2017 |
| WO | WO-2017/079191 A1 | 5/2017 |

OTHER PUBLICATIONS

International Search Report & Written Opinion for PCT/EP2019/055266 dated Jun. 21, 2019, 17 pages.
International Search Report & Written Opinion for PCT/US2018/063976 dated Feb. 6, 2019, 10 pages.
Invitation to Pay Additional Fees & Partial International Search Report for PCT/EP2019055266 dated Apr. 26, 2019, 11 pages.
Office Action for Design U.S. Appl. No. 29/646,936 dated Jul. 10, 2019, 5 pages.
Office Action for U.S. Appl. No. 16/115,040 dated Jun. 22, 2020, 11 pages.
Preliminary Search Report for French Patent App. No. 1851888 dated Nov. 13, 2018, 16 pages (with English translation).
First Office Action issued for Chinese Patent Application No. CN 201880086455.6 dated Jun. 3, 2021, 17 pages.
Notice of Allowance on U.S. Appl. No. 29/733,863 dated May 11, 2021.
Non-Final Office Action issued for U.S. Appl. No. 16/769,742 dated Mar. 25, 2022, 26 pages.
Requirement for Restriction Election issued for U.S. Appl. No. 29/726,762 dated Jan. 13, 2022, 23 pages.
Notice of Allowance issued for Design U.S. Appl. No. 29/802,529 dated May 24, 2023, 43 pages.
Office Action issued for Colombian Patent Application No. Co NC2018/0012902 dated Nov. 29, 2021, 11 pages.
International Search Report & Written Opinion for PCT/US2021/042780 dated Nov. 15, 2021, 13 pages.

* cited by examiner

FILTER ELEMENT AND HOUSING HAVING NON-CIRCULAR CROSS-SECTIONS

CROSS-REFERENCE TO RELATED APPLICATION

The present application is a National Stage of PCT Application No. PCT/EP2019/055266, filed Mar. 4, 2019, which claims priority to and benefit of French Patent Application No. 1851888, filed Mar. 5, 2018, and entitled "Filter Element and Housing Having Non-Circular Cross-Sections." The contents of these applications are hereby incorporated by reference in their entirety.

TECHNICAL FIELD

The present disclosure relates generally to filters for use with internal combustion engine systems.

BACKGROUND

Internal combustion engines generally use various fluids during operation. For example, fuel (e.g., diesel, gasoline, natural gas, etc.) is used to run the engine. Air may be mixed with the fuel to produce an air-fuel mixture, which is then used by the engine to run under stoichiometric or lean conditions. Furthermore, one or more lubricants may be provided to the engine to lubricate various parts of the engine (e.g., piston cylinder, crank shaft, bearings, gears, valves, cams, etc.). These fluids may become contaminated with particulate matter (e.g., carbon, dust, metal particles, etc.) which may damage the various parts of the engine if not removed from the fluid. To remove such particulate matter, or otherwise contaminants, the fluid is generally passed through a filter element (e.g., a fuel filter, a lubricant filter, an air filter, etc.) structured to remove the particulate matter from the fluid, prior to delivering the fluid.

Some filter assemblies include a removable filter element. For example, the filter element may be positioned within a housing. Once a filtering efficiency of a used filter element drops below a threshold (e.g., the filter element becomes clogged), the used filter element may be removed from the housing and replaced with a fresh filter. However, counterfeiting is a problem for such filtering assemblies. For example, an unauthorized filter (e.g., a counterfeit filter, a non-genuine filter, an unqualified filter, etc.) may be installed on the housing, which may lead to reduction in a filtering efficiency of the filter assembly.

SUMMARY

Embodiments described herein relate generally to filtering assemblies for filtering a fluid, for example, air or air/fuel mixture, and in particular to filtering assemblies that include a filter element and a housing having corresponding alignment features as well as corresponding non-circular cross-sections so as to facilitate alignment and prevent installation of an unauthorized filter element on the filter housing.

In a first set of embodiments, a filter assembly comprising a filter element comprises a filter media, and an alignment feature positioned on at least a portion of an outer surface of the filter media. The alignment feature comprises an alignment channel. The filter element also comprises a housing defining a housing internal volume. At least a portion of the filter element is positioned within the housing internal volume. The housing comprises an alignment protrusion extending axially from a housing inner surface towards the filter element so as to mate with the alignment channel. The alignment feature comprises a ring member positioned circumferentially around the filter media at a filter media first end proximate to the housing, and a filter baffle extending from the ring member away from the filter media first end along the outer surface of the filter media, the filter baffle circumferentially positioned on at least a portion of the outer surface of the filter media and defining the alignment channel.

In another set of embodiments, an apparatus for housing a filter element comprises a housing defining a housing internal volume, an inlet and an outlet. The internal volume is structured to receive at least a portion of the filter element. A housing baffle extends circumferentially from at least a portion of a housing inner surface into the internal volume. An alignment protrusion is formed on the housing baffle and configured to mate with a corresponding alignment channel of the filter element. The alignment protrusion defines a first cross-section at a first longitudinal end and a second cross-section at a second longitudinal end thereof that is opposite the first longitudinal end, the second cross-section different from the first cross-section such that that the alignment protrusion defines a cross-section corresponding to a cross-section of the alignment channel.

In yet another set of embodiments, a filter element for a filter assembly comprises a filter media. An alignment feature is positioned on at least a portion of an outer surface of the filter media. The alignment feature comprises a ring member positioned circumferentially around the filter media at a filter media first end proximate to the housing. A filter baffle extends from the ring member away from the filter media first end. The filter baffle is circumferentially positioned on at least a portion of the outer surface of the filter media and defines an alignment channel structured to receive a corresponding alignment protrusion of a housing of the filter assembly. The alignment channel defines a first cross-section proximate to a filter media first end that is configured to be inserted into the housing, and a second cross-section distal from the filter media first end, the second cross-section different from the first cross-section such that alignment channel has a cross-section corresponding to a cross-section of the alignment protrusion.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
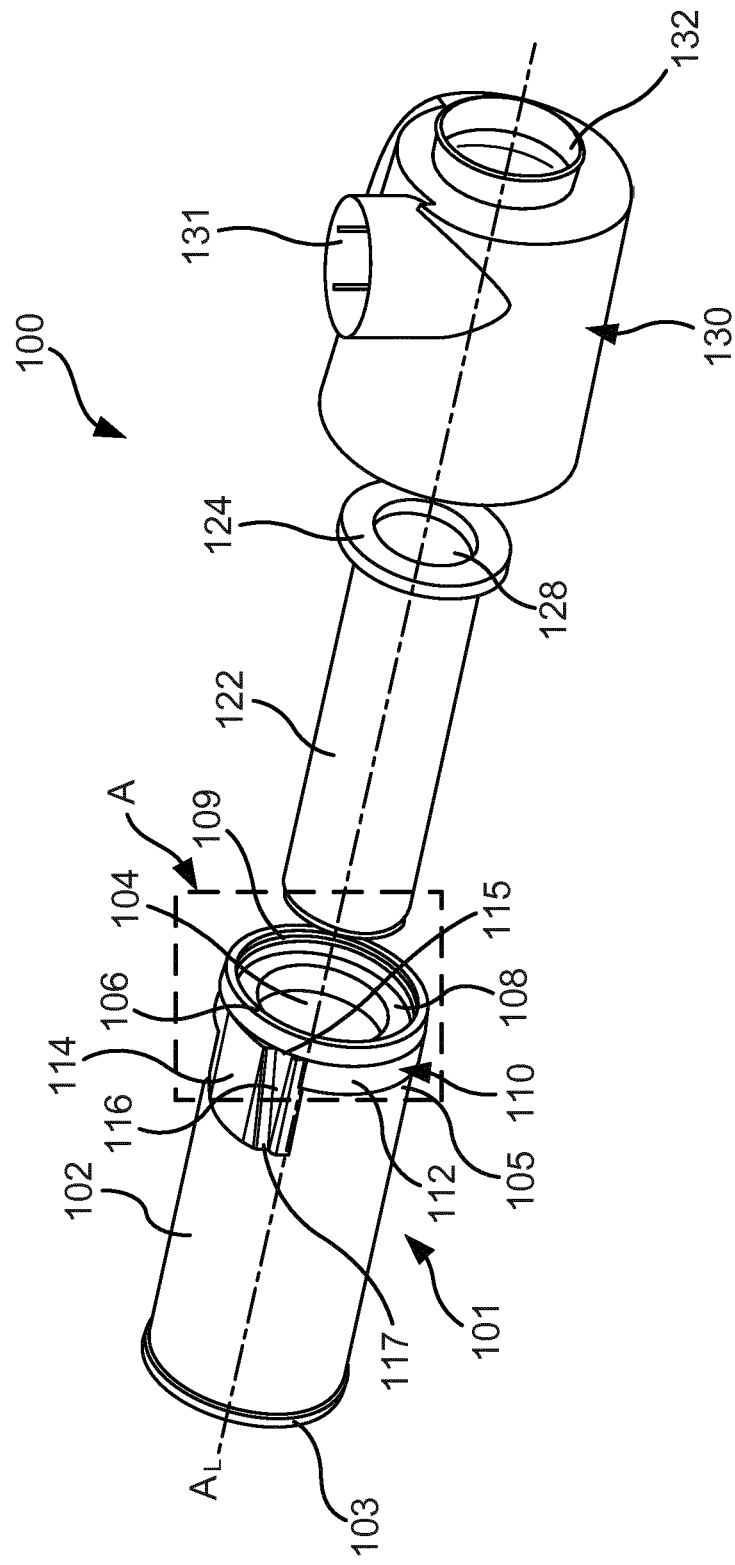
FIG. 1 is an exploded view of a filter assembly, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to filtering assemblies for filtering a fluid, for example, air or air/fuel mixture, and in particular to filtering assemblies that include a filter element and a housing having corresponding alignment features as well as corresponding non-circular cross-sections so as to facilitate alignment and prevent installation of an unauthorized filter element on the filter housing.

Some filter assemblies include a removable filter element. For example, the filter element may be positioned within or partially within a housing. Once a filtering efficiency of a used filter element drops below a threshold (e.g., the filter element becomes clogged), the used filter element may be removed from the housing and replaced with a fresh filter. However, counterfeiting is a problem for such filtering assemblies. For example, an unauthorized filter (e.g., a counterfeit filter, a non-genuine filter, an unqualified filter, etc.) may be installed on the housing, which may lead to reduction in a filtering efficiency of the filter assembly as well as lost revenue for the manufacturer of the authorized or genuine filter element.

Embodiments described herein may provide benefits including, for example: (1) providing unique alignment features and/or a non-circular shape on a filter element and housing of the filter assembly so as to prevent installation of an unauthorized filter on a filter housing of the filter assembly; (2) providing alignment features that ensure proper alignment of the filter element relative to an inlet and outlet of the housing; and (3) simple design allowing for cost-effective production.

Figure 2:
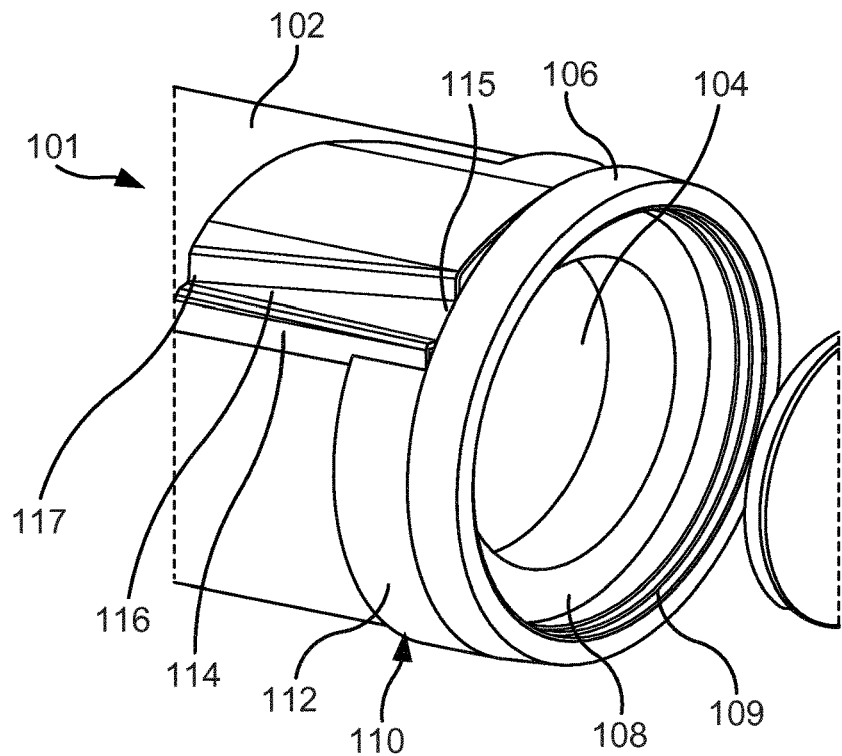
FIG. 2 is a perspective view of a portion of the filter assembly of FIG. 1 shown by the arrow A in FIG. 1.
Figure 3:
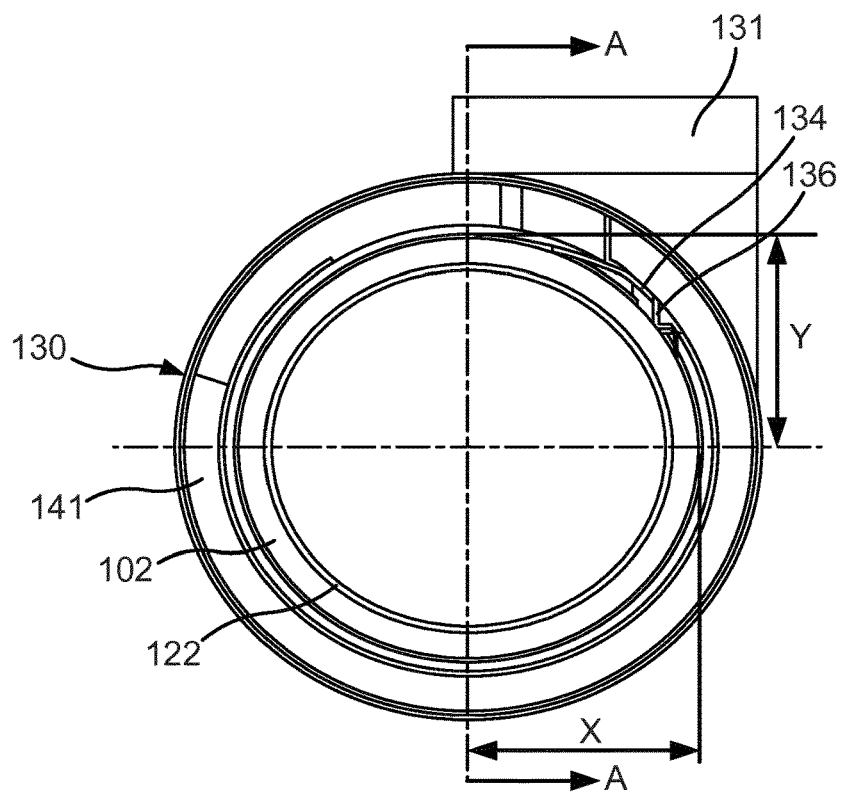
FIG. 3 is a bottom view of the filter assembly of FIG. 1.
Figure 4:
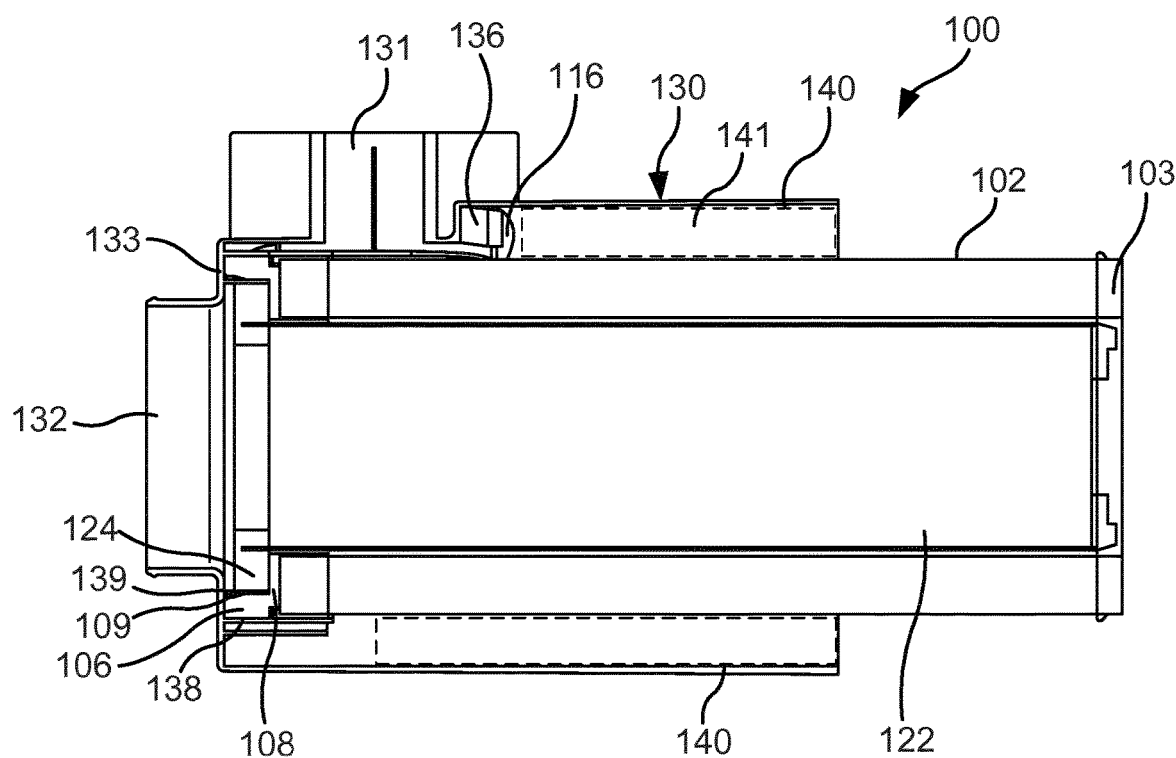
FIG. 4 is a side cross-section of the filter assembly of FIG. 1 taken along the line A-A in FIG. 3.

FIG. 1 is an exploded view of a filter assembly 100, according to an embodiment. FIGS. 2-4 are various views of the filter assembly 100. The filter assembly 100 may be used to filter a gas (e.g., air, air/fuel mixture, etc.) or any other fluid provided to an engine or a component associated with the engine. The filter assembly 100 comprises a filter element 101 and a housing 130.

The filter element 101 comprises a filter media 102. The filter media 102 is positioned along a longitudinal axis $A_L$ of the filter assembly 100. The filter media 102 comprises a porous material having a predetermined pore size and is configured to filter particulate matter from the fluid (e.g., air or air/fuel mixture) flowing therethrough. The filter media 102 may have a non-circular filter media cross-section, for example, oval, elliptical, polygonal, non-symmetric, etc. In particular embodiments, the filter media 102 defines an elliptical filter media cross-section, as shown in FIGS. 1 and 3. For example, as shown in FIG. 3, the filter media 102 may have a first radius X along a major axis of the filter media 102 which is larger than a second radius Y along a minor axis of filter media 102 such that the filter media 102 defines an elliptical filter media cross-section.

The filter media 102 may comprise pleated media, corrugated media, tetrahedral media, or variations thereof. U.S. Pat. No. 8,397,920, entitled "PLEATED FILTER ELEMENT WITH TAPERING BEND LINES," by Moy et al., filed on Oct. 14, 2011, and issued on Mar. 19, 2013, assigned to Cummins Filtration IP Inc., which is incorporated by reference in its entirety and for all purposes, describes a tetrahedral filter media. Some configurations of tetrahedral filter media may comprise a plurality of inlet tetrahedron flow channels and a plurality of outlet tetrahedron flow channels. The inlet tetrahedron merge in a central portion of the tetrahedral filter media thereby allowing axial cross-flow of air between the inlet tetrahedron channels prior to the air passing through the tetrahedral filter media. Such an arrangement provides for additional dust loading on the upstream side of the media, which increases a filter capacity of the filter media.

In some embodiments, the filter media 102 may be pleated along a plurality of bend lines extending axially along an axial direction between an upstream inlet and a downstream outlet. A plurality of wall segments may extend in serpentine manner between the bend lines and define axial flow channels therebetween. The axial flow channels may have a height along a transverse direction which is perpendicular to the axial direction. The channels may have a lateral width along a lateral direction which is perpendicular to the axial direction and perpendicular to the transverse direction. Fluid may be filtered by passing through the filter media wall segments from one channel to another. Specific arrangements of such tetrahedral filter media are further described in U.S. Pat. No. 8,397,920.

In some embodiments, the filter media 102 may be caged. For example, the filter element 101 may also comprise a porous rigid structure (e.g., a wire mesh) positioned around the filter media 102, and structured to prevent damage to the filter media 102, for example, during installation of the filter element 101 in the housing 130. In other embodiments, a pre-filter 140 (e.g., a safety filter) may be positioned around the filter media 102, as shown in FIG. 4. The pre-filter 140 may have a pre-filter cross-section corresponding to the filter media cross-section (e.g., elliptical).

The filter media 102 includes a filter media first end 105 proximate to the housing 130 and a filter media second end opposite the filter media first end 105. A second end cap 103 is coupled to the filter media second end. The second end cap 103 may be formed from any suitable material, for example, plastics, metals, reinforced rubber, polymers (e.g., polyurethane or polyurea). The filter media 102 may be embedded or potted in the second end cap 103 (e.g., during a second end cap 103 molding process) or coupled to the second end cap 103 via fusion bonding (e.g., hot fusion bonding) or an adhesive.

The filter media 102 defines an axial channel 104 about the longitudinal axis $A_L$ of the filter assembly 100. A center tube 122 is positioned within the axial channel 104. In some embodiments, the axial channel 104 may define a non-circular axial channel cross-section, for example, an elliptical cross-section. Furthermore, the center tube 122 may define a non-circular center tube cross-section (e.g., an elliptical cross-section) corresponding to the non-circular axial channel cross-section. In this manner, the center tube 122, the filter media 102 and the axial channel 104 defined within the filter media 102 may each have corresponding non-circular cross-sections (e.g., elliptical cross-sections).

In some embodiments, the center tube 122 may be included in the filter element 101. For example, the filter media 102 may be wound around the center tube 122 such that the center tube 122 is removable from the housing 130 with the filter media 102, as described herein. In such embodiments, the center tube 122 may be formed from an inexpensive material, for example cardboard, which may be more environmentally friendly than plastic or other non-disposable or non-biodegradable materials. The center tube 122 may also comprise a center tube sealing member 124 positioned on a center tube first end proximate to the housing 130. The center tube sealing member 124 may extend radially outwards from the center tube first end. The center tube sealing member 124 is structured to form a fluid tight seal with a second sealing member 108 of the filter element 101 and/or with a housing inner surface 133 of the housing 130, as described in further detail herein.

The center tube 122 defines a center tube channel 128. A plurality of pores or openings may be defined in the center tube 122. The fluid (e.g., air or air/fuel mixture) may flow radially through the filter media 102 into the center tube channel 128 and is filtered (i.e., particles or contaminants included therein are removed) by the filter media 102. The filtered fluid may then be communicated out of the filter assembly 100 through the center tube channel 128. In other arrangements, unfiltered fluid may flow into the center tube channel 128 and flow out of center tube channel 128 through the filter media 102 so as to be filtered thereby. In such arrangements, the pre-filter 140 may be positioned within the center tube channel 128.

Referring to FIGS. 1 and 2, the filter element 101 comprises a first sealing member 106 positioned circumferentially at the filter media first end 105 proximate to the housing 130. The first sealing member 106 extends axially from the filter media first end 105 to the housing inner surface 133 so as to form a fluid tight seal with the housing inner surface 133. The filter element 101 further comprises the second sealing member 108 positioned at the filter media first end 105 within the first sealing member 106.

For example, the first sealing member 106 may have a cross-section which is larger than a cross-section of the second sealing member 108 such that the first sealing member 106 is positioned around the second sealing member 108. The second sealing member 108 contacts the center tube sealing member 124 so as to form a fluid tight seal with the center tube sealing member 124. In some embodiments, the first sealing member 106 may have an axial height which is greater than an axial height of the second sealing member 108 such that the first sealing member 106 is positioned around the center tube sealing member 124, as shown in FIG. 4. In this manner, the first sealing member 106 and the second sealing member 108 may cooperatively form a seat to receive the center tube sealing member 124. In particular embodiments, a radial inner surface of the first sealing member 106 may contact a radial outer surface of the center tube sealing member 124 so as to form a radial fluid tight seal therewith.

The first sealing member 106 and the second sealing member 108 may be formed form a flexible material, for example, polymers (e.g., polyurethane, polyurea, etc.), rubber, etc. In some embodiments, the first sealing member 106 and the second sealing member 108 may be monolithically formed, for example, in a single molding process. In particular embodiments, the first sealing member 106 and the second sealing member 108 may be included in a first end cap of the filter media coupled to the filter media first end 105 (e.g., via embedding the filter media first end 105 there during a molding process, via hot bonding or an adhesive, etc.). In other embodiments, the first sealing member 106 and the second sealing member 108 may be positioned on the first end cap and coupled thereto (e.g., via an adhesive).

Figure 5:
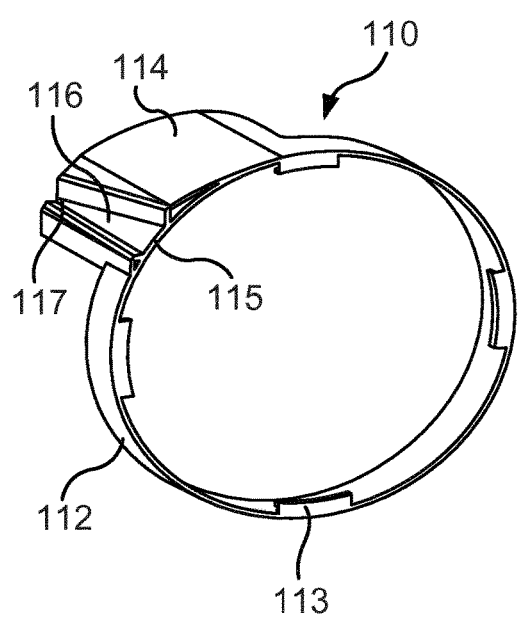
FIG. 5 is a perspective view a filter baffle included in the filter assembly of FIG. 1 removed from the filter assembly.

The filter element 101 also comprises an alignment feature 110. The alignment feature 110 comprises an alignment channel 116 positioned on at least a portion of an outer surface of the filter media 102 and structured to receive an alignment protrusion 136 of the housing 130, for example, to facilitate orientation and/or alignment of the filter element 101 with the housing 130. Referring to FIGS. 1, 2 and 5, the alignment feature 110 may comprise a ring member 112 (e.g., a metallic or plastic ring) positioned circumferentially around the filter media 102 at the filter media first end 105 proximate to the housing 130. A plurality of arms 113 may protrude radially inwards from a ring member first end proximate the filter media first end 105. The plurality of arms 113 may be interposed between the first sealing member 106 and the filter media first end 105 so as to secure the alignment feature 110 to the filter media first end 105.

A filter baffle 114 extends from the ring member 112 away from the housing 130. The filter baffle 114 is circumferentially positioned on at least a portion of the outer surface of the filter media 102 and defines the alignment channel 116 therein. The alignment channel 116 defines a first cross-section at an alignment channel first end 115 proximate to the housing 130 (i.e., at the filter media first end 105) and a second cross-section at an alignment channel second end 117 distal from the housing 130. The second cross-section is smaller than the first cross-section such that the alignment channel 116 has a constantly narrowing cross-section from the alignment channel first end 115 to the alignment channel second end 117. For example, the alignment channel 116 may comprise an inclined sidewall so as to define a wedge shaped channel.

The housing 130 defines a housing internal volume, an inlet 131 and an outlet 132. The inlet 131 is defined in a radial sidewall of the housing 130 parallel to the longitudinal axis $A_L$, while the outlet 132 is defined on an end wall of the housing 130 along the longitudinal axis $A_L$. The housing 130 may be formed from a strong and rigid material, for example plastics (e.g., polypropylene, high density polyethylene, polyvinyl chloride, etc.), metals (e.g., aluminum, stainless steel, etc.), polymers (e.g., reinforced rubber, silicone) or any other suitable material.

At least a portion of the filter element 101 is positioned within the housing internal volume. The housing 130 may have a non-circular housing cross-section (e.g., elliptical cross-section) corresponding to the non-circular filter media cross-section (e.g., elliptical). In other embodiments, the first sealing member 106 and/or the second sealing member 108 may have a non-circular cross-section corresponding to the non-circular cross-section of the housing 130, and the filter media 102 may have a circular or any other cross-section not corresponding to the non-circular cross-section of the housing 130.

Figure 6:
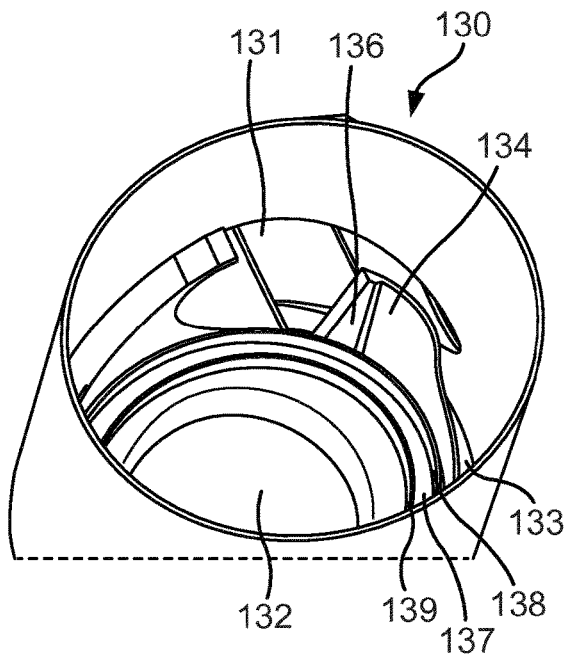
FIG. 6 is a bottom perspective view of a housing of the filter assembly of FIG. 1 removed from the filter assembly.

The housing 130 comprises an alignment protrusion 136 extending axially from the housing inner surface 133 towards the filter element 101 so as to mate with the alignment channel 116. Referring to FIGS. 4 and 6, the housing 130 comprises a housing baffle 134 extending circumferentially from at least a portion of the housing inner surface 133 towards the filter element 101. The alignment protrusion 136 is formed on the housing baffle 134, for example, a radial inner surface thereof. The housing baffle 134 may be monolithically formed with the housing 130 (e.g., during a molding process).

In particular embodiments, the alignment protrusion 136 may define a wedge shape corresponding to the wedge shaped cross-section of the alignment channel 116. In this manner, the corresponding non-circular cross-sections of the filter element 101 or at least a portion thereof, and the housing 130 may serve as a primary alignment feature for orienting the filter element 101 relative to the housing 130. Furthermore, the alignment channel 116 and the alignment protrusion 136 may serve as secondary alignment features to enable proper alignment of the filter element 101 with the housing 130, for example, to ensure proper positioning of the filter element 101 with respect to the inlet 131 and the outlet 132 of the housing 130.

As shown in FIGS. 4 and 6, the housing 130 may comprise a first circumferential wall 138 extending axially from the housing inner surface 133 towards the filter element 101. The housing 130 also comprises a second circumferential wall 139 extending axially from the housing inner surface 133 towards the filter element 101. The second circumferential wall 139 is radially offset from the first circumferential wall 138 (e.g., positioned radially inwards from the first circumferential wall 138) such that a track 137 is defined between the first circumferential wall 138 and the second circumferential wall 139.

At least a portion of the first sealing member 106 of the filter element 101 is positioned in the track 137. In particular embodiments, the track 137 may have a width corresponding to a thickness of the first sealing member 106 such that the first sealing member 106 may contact the first circumferential wall 138 and the second circumferential wall 139 so as to form a fluid tight seal therewith. Threads 109 may be defined on a radial inner surface of the first sealing member 106. Moreover, mating threads may be defined on a corresponding surface of the second circumferential wall 139. The threads 109 may engage the mating threads so as to couple the filter element 101 to the housing 130. In other embodiments, the first sealing member 106 may be friction fit into the track 137. In still other embodiments, the first sealing member 106 and the first and/or second circumferential wall 138, 139 may include snap-fit features (e.g., notches, grooves, indents, detents, ledges, protrusions, etc.) configured to snap-fit the first sealing member 106 to the first and/or second circumferential wall 138, 139.

The housing cross-section of the housing 130 may be larger than the filter media cross-section of the filter media 102 such that a radial gap 141 is defined between at least a portion of the housing 130 and the filter element 101. The radial gap 141 may be structured to receive the pre-filter 140. The pre-filter 140 may also have a non-circular cross-section corresponding to the non-circular filter media cross-section.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter assembly, comprising:
    a filter element, comprising:
        a filter media; and
        a first sealing member positioned circumferentially at a filter media first end of the filter media;
    an alignment feature positioned on at least a portion of an outer surface of the filter media and protruding radially beyond the first sealing member, the alignment feature comprising an alignment channel; and
    a housing defining a housing internal volume, at least a portion of the filter element positioned within the housing internal volume, the housing comprising an alignment protrusion extending axially from a housing inner surface towards the filter element so as to mate with the alignment channel,
    wherein the alignment feature comprises:
        a ring member positioned circumferentially around the filter media at a filter media first end proximate to the housing, and
        a filter baffle extending from the ring member away from the filter media first end along the outer surface of the filter media, the filter baffle spaced axially apart from an axial end of the filter element by the first sealing member, the filter baffle circumferentially positioned on at least a portion of the outer surface of the filter media and defining the alignment channel.

2. The filter assembly of claim 1, wherein the filter media has a non-circular filter media cross-section, and wherein the housing has a non-circular housing cross-section corresponding to the non-circular filter media cross-section.

3. The filter assembly of claim 2, wherein the filter media defines an axial channel about a longitudinal axis of the filter assembly, the axial channel defining a non-circular axial channel cross-section, and wherein the filter assembly further comprises a center tube positioned within the channel, the center tube defining a non-circular center tube cross-section corresponding to the non-circular axial channel cross-section.

4. The filter assembly of claim 3, wherein the non-circular filter media cross-section and the non-circular axial channel cross-section are elliptical.

5. The filter assembly of claim 1, wherein the housing further comprises a housing baffle extending circumferentially from at least a portion of the housing inner surface towards the filter element and positioned around the filter baffle, the alignment protrusion formed on the housing baffle.

6. The filter assembly of claim 1, wherein the alignment channel defines a first cross-section proximate to the filter media first end and a second cross-section distal from the filter media first end, the second cross-section smaller than the first cross-section such that alignment channel has a constantly narrowing cross-section from the first cross-section to the second cross-section.

7. The filter assembly of claim 1, wherein the alignment protrusion defines a wedge shape corresponding to the cross-section of the alignment channel.

8. The filter assembly of claim 1, wherein the first sealing member forms part of a first end cap coupled to the first media first end of the filter media, the alignment feature protruding radially beyond the first end cap, the first sealing member extending axially from the filter media first end to the housing inner surface so as to form a fluid tight seal with the housing inner surface.

9. The filter assembly of claim 8, wherein the housing further comprises:
 a first circumferential wall extending axially from the housing inner surface towards the filter element; and
 a second circumferential wall extending axially from the housing inner surface towards the filter element, the second circumferential wall radially offset from the first circumferential wall such that a track is defined between the first circumferential wall and the second circumferential wall,
 wherein at least a portion of the first sealing member is positioned in the track.

10. The filter assembly of claim 9, wherein the track has a width corresponding to a thickness of the first sealing member.

11. The filter assembly of claim 9, wherein threads are defined on a radial inner surface of the first sealing member, and wherein mating threads are defined on a corresponding surface of the second circumferential wall, the threads engaging the mating threads so as to couple the filter element to the housing.

12. The filter assembly of claim 9, wherein the center tube comprises a center tube sealing member positioned on a center tube first end proximate to the housing, and wherein the filter element further comprises a second sealing member positioned at the filter media first end within the first sealing member, the second sealing member contacting the center tube sealing member so as to form a fluid tight seal with the center tube sealing member.

13. The filter assembly of claim 12, wherein the first sealing member is positioned around the center tube sealing member.

14. The filter assembly of claim 1, wherein a radial gap is defined between at least a portion of the housing and the filter element, the radial gap structured to receive a pre-filter having a non-circular cross-section corresponding to the non-circular filter media cross-section.

15. The filter assembly of claim 1, wherein the first sealing member extends axially from the first media first end to the housing inner surface and forms a fluid tight seal with the housing inner surface.

16. The filter assembly of claim 1, wherein the ring member includes a plurality of arms, the plurality of arms interposed between the first sealing member and the filter media first end.

17. A filter element for a filter assembly, comprising:
 a filter media;
 a first sealing member positioned circumferentially at a filter media first end of the filter media; and
 an alignment feature positioned on at least a portion of an outer surface of the filter media and protruding radially beyond the first sealing member, the alignment feature comprising:
  a ring member positioned circumferentially around the filter media at a filter media first end proximate to the housing; and
  a filter baffle extending from the ring member away from the filter media first end along the outer surface of the filter media, the filter baffle spaced axially apart from an axial end of the filter element by the first sealing member, the filter baffle circumferentially positioned on at least a portion of the outer surface of the filter media and defining an alignment channel structured to receive a corresponding alignment protrusion of a housing of the filter assembly,
 wherein the alignment channel defines a first cross-section proximate to a filter media first end that is configured to be inserted into the housing, and a second cross-section distal from the filter media first end, the second cross-section different from the first cross-section such that alignment channel has a cross-section corresponding to a cross-section of the alignment protrusion.

18. The filter element of claim 17, wherein the housing has a non-circular housing cross-section corresponding to the non-circular filter media cross-section, and wherein the filter media has a non-circular filter media cross-section.

19. The filter element of claim 18, wherein the filter media defines an axial channel about a longitudinal axis of the filter assembly, the axial channel defining a non-circular axial channel cross-section, and wherein the filter element further comprises a center tube positioned within the channel, the center tube defining a non-circular center tube cross-section corresponding to the non-circular axial channel cross-section.

20. The filter element of claim 17, wherein the ring member includes a plurality of arms, the plurality of arms interposed between the first sealing member and the filter media first end.

* * * * *